United States Patent Office 3,345,193
Patented Oct. 3, 1967

3,345,193
ASPHALT EMULSION-SULFATE LIQUOR SOIL
STABILIZATION MIXTURE
Armin C. Pitchford, Bartlesville, Okla., assignor to Phillips Petroleum Company, a corporation of Delaware
No Drawing. Filed Jan. 29, 1965, Ser. No. 429,116
7 Claims. (Cl. 106—123)

ABSTRACT OF THE DISCLOSURE

A soil stabilization mixture of (1) an oil-in-water asphalt emulsion containing from 50 to 75 weight percent asphalt, from 25 to 50 weight percent water, and from 0.5 to 3.5 weight percent of a nonionic emulsifying agent and (2) a sulfate liquor obtained from the chemical pulping of wood and containing 15 to 65 weight percent solids. The sulfate liquor being used in an amount such that the solids contributed thereby is less than 14 weight percent of the total mixture and the asphalt emulsion is at least 50 weight percent of the total mixture.

---

This invention relates to a blend of a nonionic asphalt emulsion and a sulfate liquor. In a further aspect, the invention relates to the use of such a blend in soil stabilization.

Asphalt emulsions have been used for soil stabilization for several years. In some instances, such as logging roads, which are used for a relatively short period of time the use of such emulsions is prohibitively expensive. I have discovered that good soil stabilization can be obtained using a blend of certain nonionic asphalt emulsions and waste sulfate liquor. Other asphalt emulsions can not be used because of their low tolerance for sulfate liquor.

It is surprising that sulfate liquors can be used in combination with the asphalt emulsions. Previous attempts to use such liquors in soil stabilization have been relatively unsuccessful because of water solubility of the solids therein. Because of this water solubility, the stabilizer is soon leached from the soil resulting in a poor roadbed. The blends of this invention produce remarkably stable soils even when the stabilized soil is only partially dried. Of course, better results are obtained with substantially complete drying.

An object of this invention is to provide a new composition useful for soil stabilization. A further object is to provide new compositions comprising a blend of a nonionic asphalt emulsion and waste sulfate liquor. A further object is to provide less expensive soil stabilization compositions. A further object is to provide a new method of soil stabilization.

Other objects and advantages of the invention will become apparent to those skilled in the art upon reading this disclosure.

In one aspect, the invention resides in a mixture of (1) an oil-in-water asphalt emulsion comprising asphalt, water and a nonionic emulsifying agent of the formula:

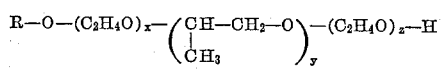

where:

R is selected from the group consisting of hydrogen, aryl and alkaryl radicals; and $x$, $y$ and $z$ are integers, such that (1) when $x$ is zero, $y$ is also zero, $z$ is in the range of 20 to 60, inclusive, and said R is one of said aryl and alkaryl radicals, and (2) when $x$ and $y$ are greater than zero, the sum of $x$ and $z$ is in the range of 50 to 350, inclusive, and $y$ is in the range of 40 to 60, inclusive, wherein, based on the total weight of the emulsion, the amount of asphalt is 50 to 75 weight percent, the amount of water is 25 to 50 weight percent, and the amount of nonionic emulsifying agent is 0.5 to 3.5 weight percent, and (2) sulfate liquor containing 15 to 65 weight percent solids, said sulfate liquor being used in an amount such that the solids contributed thereby is less than 14 weight percent of the total mixture and the asphalt emulsion is at least 50 weight percent of the total mixture.

In another aspect, the invention resides in the method of stabilizing soils by applying the above blend thereto. Finally, the invention relates to soil stabilized with the blend.

The nonionic asphalt emulsions useful in the present invention are those disclosed and claimed in my copending applicatiton, Ser. No. 316,139, filed Oct. 14, 1963. For the purpose of the present invention, additional cationic or anionic emulsifying agents should not be used. The nonionic emulsifying agents, as shown by the structural formula above, represent a rather narrow class of compounds and they each have a critical balance of hydrophobic component (propyleneoxy) and a hydrophilic component (ethyleneoxy) which is necessary to prepare suitable asphalt emulsions.

Many of the nonionic emulsifying agents which can be used in this invention are commercially available, such as Triton X-205, Triton X-305, and Triton X-405, each of which is a mixture of octylphenoxypoly(ethyleneoxy) ethanols with 20, 30 and 40 ethyleneoxy groups in the poly(ethyleneoxy) chain, respectively, and Pluronic P-104, Pluronic P-105, and Pluronic F-108, which are materials having the general formula

where the sum of $a$ and $c$ is about 50, 74 or 296, respectively, and where $b$ is about 56.

Asphalts which can be employed in the preparation of the asphalt emulsions include any of those bituminous materials used heretofore and known in the prior art, such as natural asphalts or those derived from petroleum refining, for example by steam refining and/or air blowing, etc. Paving asphalts characterized by penetrations (ASTM D-5) from zero to about 300 or even higher, and preferably from about 40–300, and having softening points (ASTM D-36-26) in the range of 90° to 250° F., preferably 100° to 150° F., represent suitable asphalts which can be used.

In making the asphalt emulsion, usual practice is to disperse the nonionic emulsifier in water to form the soap solution, which is then warmed to a temperature of 90–200° F., preferably 90–125° F. The asphalt can be heated to a temperature in the range of 150–350° F., preferably 250–300° F. The warm soap solution and asphalt are then proportioned to a colloid mill to emulsify the mixture, during which milling the temperature of the mixture can be in the range of 100–210° F., preferably 150–200° F. Thereafter, the emulsion is cooled.

The sulfate liquor used in the blends of this invention is obtained in the so-called sulfate, or kraft, process of chemical pulping of wood. In this process the wood is heated under pressure with an alkaline solution containing sodium sulfide. The name derives from the fact that chemical losses are made up by addition of sodium sulfate, which is reduced to sodium sulfide in situ. Sulfate liquors containing 15 to 65 weight percent solids can be used. The amount of sulfate liquor used is adjusted so that the total percentage solids contributed by the sulfate liquor—i.e., the product of the weight percent sulfate liquor used and the weight percent solids in that liquor— is less than 14 weight percent.

Furthermore, the asphalt emulsion should comprise at least 50 weight percent of the total blend. In the asphalt emulsion, the amount of asphalt is 50 to 75 weight percent, the amount of water is 25 to 50 weight percent and the amount of emulsifier is 0.5 to 3.5 weight percent. For best results, the asphalt emulsion should have a pH of at least 7.1, preferably 8.3 to 10. A small amount of alkali metal hydroxide can be added to get this pH.

The asphalt emulsion and sulfate liquor are blended by stirring together in any type of low-shear blending equipment.

The blend can be applied in any suitable manner. The portable powered mixing drums can be used. However, this is seldom necessary. For the purposes for which this blend is generally used, the proposed road surface is graded to form a windrow and the blend sprayed thereon. The treated soil is thereafter worked to get a good mixture, and subsequently rolled and compacted in the usual manner. The amount of the blend used depends on many factors such as the type of soil, the particle size of the soil, the length of time that a desired degree of stability will be required, the climate, etc. For these reasons, it is difficult to set a specific range that will suit all occasions but most operations will use the blend in an amount to provide 3 to 20 percent by weight solids based on the weight of the soil.

The following example illustrates a specific embodiment of my invention. It should not be considered unduly limiting.

*Example*

A nonionic asphalt emulsion having a pH of 9.5 was prepared using the following recipe:

| | Parts by weight |
|---|---|
| Asphalt (100/200 Pen) | 65.2 |
| NaOH | Trace |
| Triton X–305 | 2.0 |
| Water | 32.8 |

A number of blends were made of this emulsion and two different sulfate liquors. The composition and stability of those blends are shown in the following tabulation, and the results indicate that only those blends having less than 14 weight percent solids derived from the sulfate liquor are stable:

| Run No. | Weight Percent | | Weight Percent Solids | | Stability of Blend after 24 hours |
|---|---|---|---|---|---|
| | Asphalt Emulsion | Sulfate Liquor | In Liquor | In Blend | |
| 1 | 10 | 90 | 50 | 45 | Broken. |
| 2 | 20 | 80 | 50 | 40 | Do. |
| 3 | 50 | 50 | 50 | 25 | Do. |
| 4 | 60 | 40 | 50 | 20 | Slight Creaming, unstable. |
| 5 | 70 | 30 | 50 | 15 | Do. |
| 6 | 80 | 20 | 50 | 10 | Stable. |
| 7 | 90 | 10 | 50 | 5 | Do. |
| 8 | 10 | 90 | 24 | 21.6 | Broken. |
| 9 | 20 | 80 | 24 | 19.2 | Do. |
| 10 | 30 | 70 | 24 | 16.8 | Heavy Creaming, unstable. |
| 11 | 40 | 60 | 24 | 14.4 | Do. |
| 12 | 50 | 50 | 24 | 12.0 | Stable. |
| 13 | 60 | 40 | 24 | 9.6 | Do. |

An aggregate mixing test was made using 84.1 parts by weight of soil from a Northwest logging area which contained a high proportion of granite sand and 15.9 parts of a blend prepared in the same manner as the blend of Run No. 12. Mix time was 180+ seconds. When the mixed aggregate was dried to remove all water initially present, only 0.4 weight percent of soluble matter could then be removed by water leaching. When the mixed aggregate was dried to remove only 57 percent of the water initially present, 2.3 weight percent of the soluble matter could then be removed by water leaching.

Reasonable variations and modifications are possible within the scope of this disclosure without departing from the spirit and scope of the invention.

I claim:

1. A mixture of (1) an oil-in-water asphalt emulsion having a pH of at least 7.1 comprising asphalt, water and a nonionic emulsifying agent of the formula:

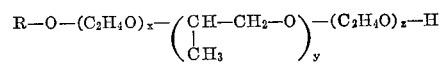

where:

R is selected from the group consisting of hydrogen, aryl and alkaryl radicals; and $x$, $y$ and $z$ are integers, such that (1) when $x$ is zero, $y$ is also zero, $z$ is in the range of 20 to 60, inclusive, and said R is one of said aryl and alkaryl radicals, and (2) when $x$ and $y$ are greater than zero, the sum of $x$ and $z$ is in the range of 50 to 350, inclusive, and $y$ is in the range of 40 to 60, inclusive, wherein, based on the total weight of the emulsion, the amount of asphalt is 50 to 75 weight percent, the amount of water is 25 to 50 weight percent, and the amount of nonionic emulsifying agent is 0.5 to 3.5 weight percent, and (2) sulfate liquor obtained from the chemical pulping of wood and containing 15 to 65 weight percent solids, said sulfate liquor being used in an amount such that the solids contributed thereby is less than 14 weight percent of the total mixture and the asphalt emulsion is at least 50 weight percent of the total mixture.

2. A mixture of (1) 50 to 90 parts by weight of an oil-in-water asphalt emulsion comprising, on a weight basis, 50 to 75 parts of asphalt, 25 to 50 parts of water, 0.5 to 3.5 parts of a mixture of octylphenoxypoly(ethyleneoxy) ethanols with 30 ethyleneoxy groups in the poly(ethylenoxy) groups, and sufficient sodium hydroxide to give a pH of 8.3 to 10 and (2) 50 to 10 parts by weight of a sulfate liquor obtained from the chemical pulping of wood and containing 15 to 65 weight percent solids, said sulfate liquor being used in an amount such that the solids contributed thereby is less than 14 weight percent of the total mixture and the asphalt emulsion is at least 50 weight percent of the total mixture.

3. A mixture of (1) 50 parts by weight of an oil-in-water asphalt emulsion having a pH of at least 7.1 comprising, on a weight basis, 65.2 parts of asphalt, 32.8 parts of water, 2 parts of a mixture of octylphenoxypoly(ethyleneoxy)ethanols with 30 ethyleneoxy groups in the poly(etheneoxy) groups, and sufficient sodium hydroxide to give a pH of 9.5 and (2) 50 parts by weight of a sulfate liquor obtained from the chemical pulping of wood and containing 24 weight percent solids.

4. A method of stabilizing soil which comprises adding thereto a mixture of (1) an oil-in-water asphalt emulsion having a pH of at least 7.1 comprising asphalt, water and a nonionic emulsifying agent of the formula:

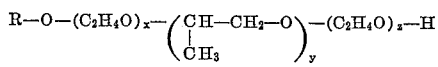

where:
R is selected from the group consisting of hydrogen, aryl and alkaryl radicals; and
$x$, $y$ and $z$ are integers, such that (1) when $x$ is zero, $y$ is also zero, $z$ is in the range of 20 to 60, inclusive, and said R is one of said aryl and alkaryl radicals, and (2) when $x$ and $y$ are greater than zero, the sum of $x$ and $z$ is in the range of 50 to 350, inclusive, and $y$ is in the range of 40 to 60, inclusive, wherein, based on the total weight of the emulsion, the amount of asphalt is 50 to 75 weight percent, the amount of water is 25 to 50 weight percent, and the amount of nonionic emulsifying agent is 0.5 to 3.5 weight percent, and (2) sulfate liquor obtained from the chemical pulping of wood and containing 15 to 65 weight percent solids, said sulfate liquor being used in an amount such that the solids contributed thereby is less than 14 weight percent of the total mixture and the asphalt emulsion is at least 50 weight percent of the total mixture.

5. The method of claim 4 wherein said mixture is added in an amount to provide 3 to 20 percent by weight solids based on the weight of the soil.

6. Soil containing a stabilizing amount of a mixture (1) an oil-in-water asphalt emulsion having a pH of at least 7.1 comprising asphalt, water and a nonionic emulsifying agent of the formula:

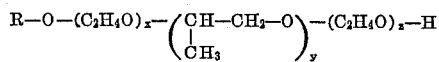

where:
R is selected from the group consisting of hydrogen, aryl and alkaryl radicals; and
$x$, $y$ and $z$ are integers, such that (1) when $x$ is zero, $y$ is also zero, $z$ is in the range of 26 to 60, inclusive, and said R is one of said aryl and alkaryl radicals, and (2) when $x$ and $y$ are greater than zero, the sum of $x$ and $z$ is in the range of 50 to 350, inclusive, and $y$ is in the range of 40 to 60, inclusive, wherein, based on the total weight of the emulsion, the amount of asphalt is 50 to 75 weight percent, the amount of water is 25 to 50 weight percent, and the amount of nonionic emulsifying agent is 0.5 to 3.5 weight percent, and (2) sulfate liquor obtained from the chemical pulping of wood and containing 15 to 65 weight percent solids, said sulfate liquor being used in an amount such that the solids contributed thereby is less than 14 weight percent of the total mixture and the asphalt emulsion is at least 50 weight percent of the total mixture.

7. The soil of claim 6 wherein said mixture was added in an amount to provide 3 to 20 percent by weight solids based on the weight of the soil.

References Cited

UNITED STATES PATENTS

| | | | |
|---|---|---|---|
| 2,375,019 | 5/1945 | Miller | 106—123 |
| 2,494,708 | 1/1950 | Jesseph | 252—331.5 |
| 3,108,441 | 10/1963 | Watson | 106—287 |
| 3,123,569 | 3/1964 | Borgfeldt | 106—277 |
| 3,126,350 | 3/1964 | Borgfeldt | 106—277 |
| 3,131,075 | 4/1964 | Brooks | 106—123 |
| 3,276,887 | 10/1966 | Pitchford | 106—277 |

OTHER REFERENCES

The Condensed Chemical Dictionary, 5th printing, 1961, p. 666.

ALEXANDER H. BRODMERKEL, *Primary Examiner.*

T. MORRIS, *Assistant Examiner.*

UNITED STATES PATENT OFFICE
CERTIFICATE OF CORRECTION

Patent No. 3,345,193                          October 3, 1967

Armin C. Pitchford

It is hereby certified that error appears in the above numbered patent requiring correction and that the said Letters Patent should read as corrected below.

Column 5, line 28, after "mixture" insert -- of --; column 6, line 2, for "26" read -- 20 --.

Signed and sealed this 7th day of January 1969.

(SEAL)
Attest:

Edward M. Fletcher, Jr.
Attesting Officer

EDWARD J. BRENNER
Commissioner of Patents